United States Patent
Liu et al.

(10) Patent No.: US 11,032,672 B2
(45) Date of Patent: Jun. 8, 2021

(54) METHOD FOR ACQUIRING LOCATION INFORMATION, TERMINAL, STORAGE MEDIUM, AND ELECTRONIC DEVICE

(71) Applicant: ZTE Corporation, Shenzhen (CN)

(72) Inventors: Fengpeng Liu, Shenzhen (CN); Dongmei Liu, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 16/955,753

(22) PCT Filed: Sep. 25, 2018

(86) PCT No.: PCT/CN2018/107320
§ 371 (c)(1),
(2) Date: Jun. 18, 2020

(87) PCT Pub. No.: WO2019/119911
PCT Pub. Date: Jun. 27, 2019

(65) Prior Publication Data
US 2020/0322760 A1    Oct. 8, 2020

(30) Foreign Application Priority Data
Dec. 22, 2017 (CN) .......... 201711405475.9

(51) Int. Cl.
*H04W 4/029* (2018.01)
*G01S 19/21* (2010.01)
*G01S 19/37* (2010.01)

(52) U.S. Cl.
CPC .......... *H04W 4/029* (2018.02); *G01S 19/21* (2013.01); *G01S 19/37* (2013.01)

(58) Field of Classification Search
None
See application file for complete search history.

(56) References Cited

U.S. PATENT DOCUMENTS

2009/0224975 A1   9/2009  Xhafa et al.
2012/0022779 A1*  1/2012  Lee ................. G01S 19/21
                                               701/408

FOREIGN PATENT DOCUMENTS

| CN | 103558616 A | 2/2014 |
| CN | 203894415 U | 10/2014 |
| CN | 106646548 A | 5/2017 |
| CN | 106908808 A | 6/2017 |

OTHER PUBLICATIONS

International Search Report and Written Opinion for International Application No. PCT/CN2018/107320, dated Dec. 29, 2018.

* cited by examiner

*Primary Examiner* — Adolf Dsouza

(57) ABSTRACT

A method for acquiring location information, a terminal, a storage medium and an electronic device are disclosed. The method may include[s]: detecting, after a positioning module of the terminal is woken up, whether there is a functional module causing signal interference to the positioning module; closing the functional module in a time-division manner, in response to there being the functional module, and acquiring collected first location information, in response to the positioning module meeting a pre-determined condition.

11 Claims, 6 Drawing Sheets

Detecting, after a positioning module of a terminal is woken up, whether there is a functional module causing signal interference to the positioning module — S202

Closing the functional module in a time-division manner, in response to there being the functional module, and acquiring collected first location information, in response to the positioning module meeting a pre-determined condition — S204

METHOD FOR ACQUIRING LOCATION INFORMATION, TERMINAL, STORAGE MEDIUM, AND ELECTRONIC DEVICE

CROSS-REFERENCE TO RELATED APPLICATION

This application is a national stage filing under 35 U.S.C. § 371 of International Patent Application Serial No. PCT/CN2018/107320, filed Sep. 25, 2018, which claims priority to Chinese patent application No. 201711405475.9 filed Dec. 22, 2017. The contents of these applications are incorporated herein by reference in their entirety.

TECHNICAL FIELD

The present disclosure relates to, but is not limited to, the field of communications.

BACKGROUND

Terminal apparatus has increasingly higher performance requirements for its own positioning module (such as the Global Positioning System, referred to as GPS). For example, online car-hailing, location sharing, online games and the like require GPS to have a faster positioning speed and more precise positioning accuracy. This requires GPS to have better performance. Most current applications require real-time, accurate positioning information. Contrary to this, the terminal supports more and more various of multi-band antennas, and bears more and more functions. The GPS function is squeezed by various aspects and easy to be interfered from other functional modules, resulting in slow and inaccurate GPS positioning.

In the related technology, there is no corresponding adjustment to the aforementioned challenges from GPS. At present, there are problems of slow speed and poor accuracy of GPS positioning in application. In addition, in the existing technology of GPS, there is no scheme to interference, which will significantly affect the GPS performance and even lead to GPS positioning failure.

For the above problems in the related technology, no effective scheme has been found yet.

SUMMARY

Embodiments of the present disclosure provide a method for acquiring location information, a terminal, a storage medium and an electronic device.

According to an embodiment of the present disclosure, there is provided a method for acquiring location information, including: detecting, after a positioning module of a terminal is woken up, whether there is a functional module causing signal interference to the positioning module; closing the functional module in a time-division manner, in response to there being the functional module, and acquiring collected first location information, in response to the positioning module meeting a pre-determined condition.

According to another embodiment of the present disclosure, there is provided a terminal, including: a detection module configured to detect, after a positioning module of a terminal is woken up, whether there is a functional module causing signal interference to the positioning module; a first acquisition module configured to close the functional module in a time-division manner, in response to there being the functional module, and acquire collected first location information, in response to the positioning module meeting a pre-determined condition.

According to yet another embodiment of the present disclosure, there is further provided a storage medium including a stored program that, when executed, performs the method described in any one of the above schemes.

According to yet another embodiment of the present disclosure, there is further provided a processor configured to execute a program that, when executed, performs the method described in any one of the above schemes.

According to the embodiments of the present disclosure, by closing the functional module causing interference to the positioning module in the terminal, it can be ensured to receive a high-quality spectrum signal for positioning, and the technical problems of slow speed and inaccuracy of positioning in the related technology can be solved.

BRIEF DESCRIPTION OF DRAWINGS

The accompanying drawings illustrated herein are used to provide further understanding of the present disclosure, and constitute a part of the present application. The schematic embodiments of the present disclosure and the illustration thereof are used to interpret the present disclosure. In the accompanying drawings.

DETAILED DESCRIPTION

The present disclosure will be described in detail below in conjunction with the embodiments with reference to the accompanying drawings. It should be noted that the embodiments in the present application and the features in the embodiments may be combined with each other as long as they do not conflict with each other.

It should be noted that terms 'first', 'second' and the like in the description, the claims and the drawings of the present disclosure are used for distinguishing similar objects, but not necessarily used for describing a specific sequence or a precedence order.

First Embodiment

Figure 1:
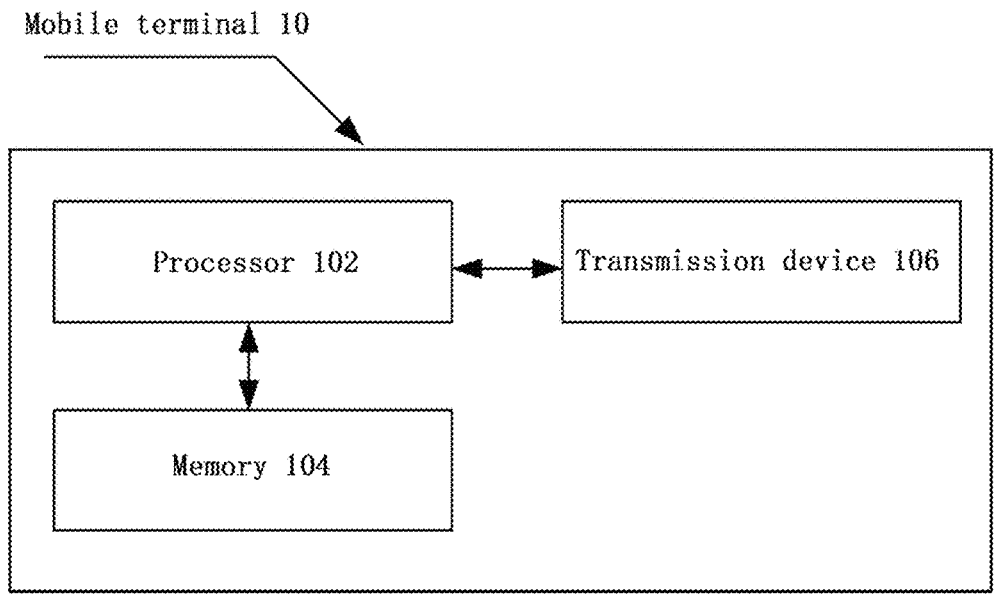
FIG. 1 is a block diagram of a hardware structure of a mobile terminal for a method for acquiring location information in accordance with an embodiment of the present disclosure.

The method embodiment provided in first embodiment of the present application can be implemented in a mobile terminal, a computer terminal or a similar computing device. Taking the mobile terminal for implementing the method as an example, FIG. 1 is a block diagram of a hardware structure of a mobile terminal for a method for acquiring location information in accordance with an embodiment of the present disclosure. As shown in FIG. 1, a mobile terminal 10 may include one or more (only one shown in FIG. 1) processors 102, a memory 104 configured to store data, and a transmission device 106 configured for communication, wherein the processor 102 may include, but is not limited to, a processing device such as a microprocessor (MCU) or a programmable logic device (FPGA). It should be understood by those skilled in the art that the structure shown in FIG. 1 is merely illustrative, and does not limit the structure of the above electronic device. For example, the mobile terminal 10 may also include more or fewer components than those shown in FIG. 1, or have a configuration different from that shown in FIG. 1.

The memory 104 may be configured to store software programs and modules of application software, such as program instructions/modules corresponding to a method for acquiring location information according to the embodiment of the present disclosure. The processor 102 implements various functional applications and data processing by running the software programs and modules stored in the memory 104, thereby implementing the above method. The memory 104 may include high-speed random access memory, and may also include non-volatile memory such as one or more magnetic storage devices, flash memory or other non-volatile solid state memory. In some examples, the memory 104 may further include memories disposed remotely from the processor 102, which may be connected to the mobile terminal 10 over network. Examples of the above network include but are not limited to the Internet, Intranet, local area network, mobile communication network, and a combination thereof.

The transmission device 106 is configured to receive or transmit data via a network. Specifically, the above network may include, for example, a wireless network provided by a communication provider of mobile terminal 10. In one example, the transmission device 106 includes a Network Interface Controller (NIC), which may be connected to other network apparatus through a base station so that it can communicate with the Internet. In one example, the transmission device 106 may be a Radio Frequency (RF) module which is configured to communicate wirelessly with the Internet.

Figure 2:
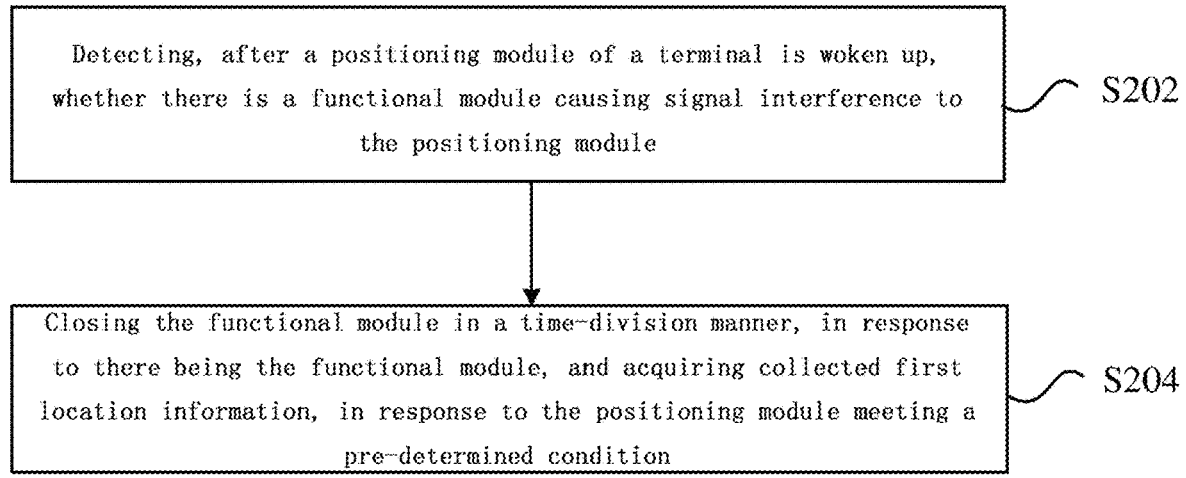
FIG. 2 is a flowchart of a method for acquiring location information in accordance with an embodiment of the present disclosure.

In the embodiment, there is provided a method for acquiring location information. FIG. 2 is a flowchart of a method for acquiring location information in accordance with an embodiment of the present disclosure. As shown in FIG. 2, the process includes the following steps:

Step S202, detecting, after a positioning module of a terminal is woken up, whether there is a functional module causing signal interference to the positioning module; and Step S204, closing the functional module in a time-division manner, in response to there being the functional module, and acquiring collected first location information, in response to the positioning module meeting a pre-determined condition.

According to the above steps, by closing the functional module causing interference to the positioning module in the terminal, it can be ensured to a receive high-quality spectrum signal for positioning, and the technical problems of slow speed and inaccuracy of positioning in the related technology can be solved.

Optionally, the execution body of the above steps may be, but is not limited to, a terminal, such as a mobile phone, a positioning device, or the like.

The positioning module in the embodiment may be, but is not limited to, a GPS module, a Beidou positioning module, a Galileo positioning module and the like.

Optionally, detecting whether there is a functional module causing signal interference to the positioning module, includes: detecting whether there is interference within a frequency band of the positioning module by spectrum scanning. It is determined whether a wireless spectrum range used by the positioning module coincides with the spectrum range used by any other module in the terminal, or there is interference therein.

Optionally, according to the embodiment, the method further includes finding and determining a specific functional module, which specifically includes: checking the interference within a frequency band of the positioning module, after traversing one or more functional modules that are operating in the terminal by closing the one or more functional modules each at a time; and determining that a currently closed functional module is an interference source generating interference signal, in response to a reduction of the interference being detected. The terminal may first use its own wireless receiving unit to perform spectrum scanning to check whether there is interference within a GPS frequency band. If there is interference, a module that is operating is closed and the interference within the GPS frequency band is checked again until the interference disappears, to determine which module or modules the interference source is. Of course, the terminal may also directly close all functional modules that may cause interference.

Optionally, acquiring collected first location information, in response to the positioning module meeting a pre-determined condition, includes:

acquiring the collected first location information, in response to the positioning module meeting at least one of following conditions: at least a pre-determined number of (such as four) satellites are searched; a carrier-to-noise ratio is greater than a first threshold; and interference signal of the functional module is less than a second threshold. Preferably, the first threshold is 25 dB.

In an embodiment, the functional module that may cause interference may be, but is not limited to: a CAM module, a Wi-Fi module, a wireless radio frequency module, a transmitter, a receiver, and the like.

In the embodiment, there is further provided a method for initial information used when the positioning module is started or/and called, and the initial information can be used for cooperatively pre-judging the location, so that the positioning time is reduced and the positioning accuracy is improved.

Optionally, according to the embodiment, the method further includes: Step S21, waking up the positioning module in accordance with a preset period, in response to the positioning module being in a sleep state; and Step S22, acquiring location data of the terminal by the positioning module, and storing the location data in the terminal. The location data is used as initial information for real-time positioning and is to be used when the positioning module is called by the terminal.

Optionally, after waking up the positioning module by the terminal, the stored location data may be used to acquire the initial information, which specifically includes: estimating second location information of the terminal after waking up the positioning module by using different positioning data acquired in different periods. Real-time second location information is estimated based on the movement speed and the movement route of the terminal, and the like.

In the scheme of the embodiment, the first location information acquired though real-time positioning and the second location information acquired in advance by the terminal may be used for final positioning, including: determining a positioning location of the terminal based on the first location information and the second location information, after acquiring the first location information and the second location information.

Determining a positioning location of the terminal based on the first location information and the second location information, may include one of:

determining the first location as the positioning location of the terminal, calculating a deviation between the first location information and the second location information, not updating the positioning location, in response to the deviation being less than a first limiting value, and updating the positioning location using the second location information, in response to the deviation being greater than the first limiting value;

calculating a deviation between the first location information and the second location information, determining the first location information as the positioning location of the terminal, in response to the deviation being less than a second limiting value, and determining the second location information as the positioning location of the terminal, in response to the deviation being not less than the second limiting value; and determining the second location information as the positioning location of the terminal, in response to the first location information being not collected within a pre-determined time.

In the embodiment, closing the functional module in a time-division manner, includes: closing the functional module within an operating time window of the positioning module; and starting the functional module within the sleep time window or standby time window of the positioning module.

Through the description of the above embodiment, those skilled in the art will clearly understand that the method according to the above embodiment can be implemented by software along with a necessary general hardware platform, or by hardware only. In many cases, a better implementation is realized by software along with a necessary general hardware platform. Based on such understanding, a part of the technical scheme of the present disclosure, which essentially contributes to the existing technology, may be embodied in the form of a software product. The computer software product is stored in a storage medium (such as Read-Only Memory (ROM)/Random Access Memory (RAM), a magnetic disk, an optical disc), and includes a number of instructions for causing a terminal apparatus (which may be a cell phone, a computer, a server, or a network apparatus or the like) to perform the method described in various embodiments of the present disclosure.

Second Embodiment

In the embodiment, there is provided a terminal configured to carry out the above embodiments and specific implementations, and the description already provided above is not detailed here. The term "module" used below may be a combination of software and/or hardware for implementing a predetermined function. The device described in the following embodiment is preferably implemented with software; however, hardware or a combination of software and hardware is also possible and contemplated.

Figure 3:
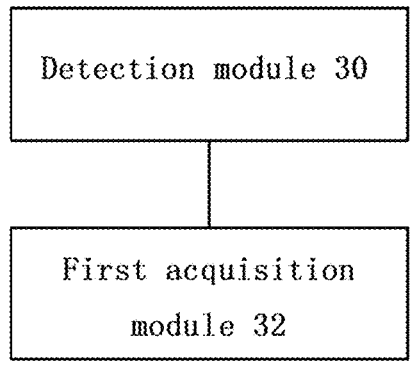
FIG. 3 is a block diagram of a structural of a terminal in accordance with an embodiment of the present disclosure.

FIG. 3 is a block diagram of a structural of a terminal in accordance with an embodiment of the present disclosure. As shown in FIG. 3, the terminal includes:

a detection module 30 configured to detect, after a positioning module of a terminal is woken up, whether there is a functional module causing signal interference to the positioning module; and a first acquisition module 32 configured to close the functional module in a time-division manner, in response to there being the functional module, and acquire collected first location information, in response to the positioning module meeting a pre-determined condition.

Optionally, the terminal further includes: a processing module configured to check the interference within a frequency band of the positioning module, after traversing one or more functional modules that are operating in the terminal by closing the one or more functional modules; and a determination module configured to determine that a currently closed functional module is an interference source generating interference signal, in response to a reduction of the interference being detected.

Optionally, the first acquisition module includes an acquisition unit configured to acquire the collected first location information, in response to the positioning module meeting at least one of following conditions: at least a pre-determined number of satellites are searched; a carrier-to-noise ratio is greater than a first threshold; and interference signal of the functional module is less than a second threshold.

Optionally, the terminal further includes: an activation module configured to wake up the positioning module in accordance with a preset period, in response to the positioning module being in a sleep state; and a second acquisition module configured to acquire location data of the terminal by the positioning module, and storing the location data in the terminal.

Optionally, the terminal further includes: an estimation module configured to estimate second location information of the terminal after waking up the positioning module by using different positioning data acquired in different periods, after waking up the positioning module by the terminal.

Optionally, the terminal further includes: a positioning module configured to determine a positioning location of the terminal based on the first location information and the second location information, after acquiring the first location information and the second location information.

It should be noted that the above individual modules may be implemented with software or hardware. In a case that the above individual modules are implemented with hardware, the modules may be implemented in the following manner without being limited thereto: the above modules are all provided in the same processor, or the above modules may be provided in different processors in any combination.

Third Embodiment

The embodiment is an optional embodiment according to the present application, which is used to describe the present application in detail in combination with specific implementations. The positioning module in the embodiment is explained with GPS as an example.

In the embodiment, there is provided a method and apparatus for GPS intelligent fast and accurate positioning, wherein the apparatus for GPS intelligent fast and accurate positioning in the embodiment includes a processor and a memory, in addition to the positioning module. In response to the problems of slow speed and poor accuracy of GPS positioning, there is provided a scheme to improve the ability and stability of terminal product for fast and accurate positioning, and thus improve user communication experience.

The embodiment is a system for a terminal to improve an anti-interference capability of GPS, and store location data detected during idle time, so as to enable a quick positioning of a mobile phone. The system uses hardware and software modules to help the terminal detect an operating scene, analyze an interference signal, switch an interference module, and store location information for a best signal to achieve the effect of improving the ability and stability of terminal product for fast and accurate positioning.

In the embodiment, there is provided a method for eliminating interference within the GPS frequency band by closing, in a time-division manner, the functional module in the terminal that causes interference to the positioning module, thereby ensuring that the GPS operates with the best received signal. In addition, when the terminal is in an idle state, the best GPS signal is analyzed and detected, and the corresponding location signal is parsed. The location data is used as initial data for the GPS hot start, so that the accuracy of the network search and the search speed are improved when the GPS application is started.

In the embodiment, the GPS (module) uses the GPS signal, from which effective parsed location information can be received, as a criterion. The criterion may be set as follows: (1) more than four satellites can be searched normally; and (2) a carrier-to-noise ratio is more than 25 dB. The software and hardware module of the embodiment are started only when this condition is reached. This not only prevents the excessive power consumption by a heavy load of system operation according to the embodiment, but also improves the effectiveness of processing the GPS information.

The system according to the embodiment is started (Previously, detection is made during an idle state of the mobile phone, to continuously accumulate terminal location information as pre-values for hot start, waiting for an application to call GPS, and directly perform "estimated positioning"). After the terminal starts GPS, the terminal may first use its own wireless receiving unit to perform spectrum scanning to check whether there is interference within a GPS frequency band. If there is interference, a component module that is operating is closed and the interference within the GPS frequency band is checked again until the interference disappears to determine which module or modules the interference source is. After the analysis is completed, GPS and these modules operate in a time-division manner to ensure the best GPS operating and provide "real-time positioning".

Finally, according to a strategy, the terminal provides "final positioning" based on the information of "estimation positioning" and "real-time positioning". As such, the GPS positioning can be fast and accurate.

Figure 4:
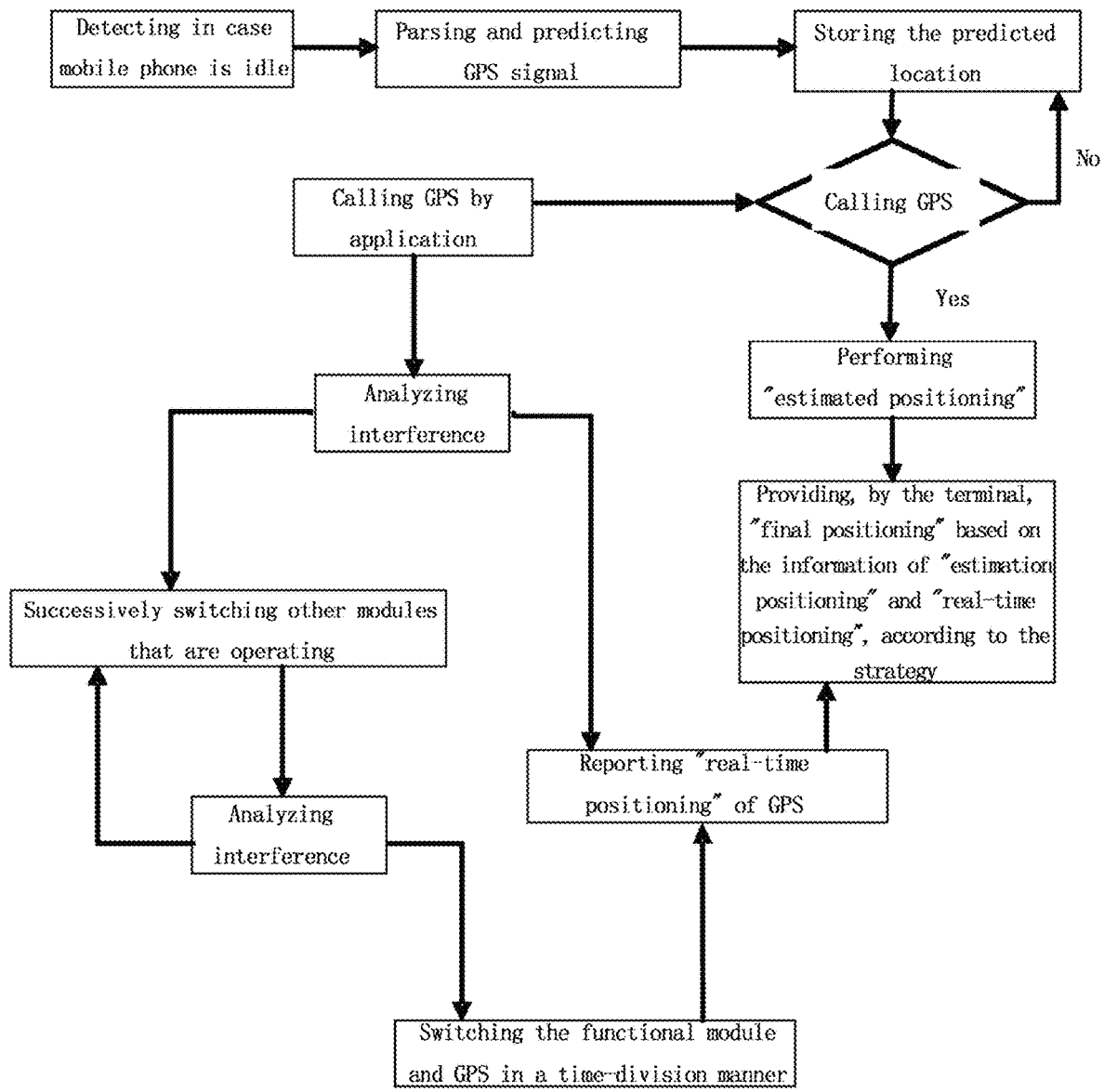
FIG. 4 is a schematic flowchart of an embodiment of the present disclosure.

FIG. 4 is a schematic flowchart of an embodiment of the present disclosure, and the complete process of the embodiment is described as follows:

In the first step, monitoring is made in case the mobile phone is in an idle state, to accumulate terminal location information, waiting for an application to call GPS, and perform "estimated positioning".

First, it is assumed that the terminal is equipped with GPS, but the GPS is not yet called by an application for real-time positioning. In the process flow according to the embodiment of the present disclosure, a GPS signal is detected and judged whether to start a module in the embodiment based on the signal quality. After the module is started, an interference removal operation is made, and then real-time GPS location information is recorded. After completion, the module enters a sleep state; and satellite data is refreshed every time the module is woken up.

Then, when in the terminal there is an application calling GPS, the GPS application software directly retrieves the satellite data collected during several previous wake-ups, as the initial data for GPS hot start. At the same time, the GPS collects real-time satellite information. If the consistency of the real-time information with the previous information exceeds a certain threshold, the "estimated positioning" is directly confirmed to use and reported to the application.

Figure 5:
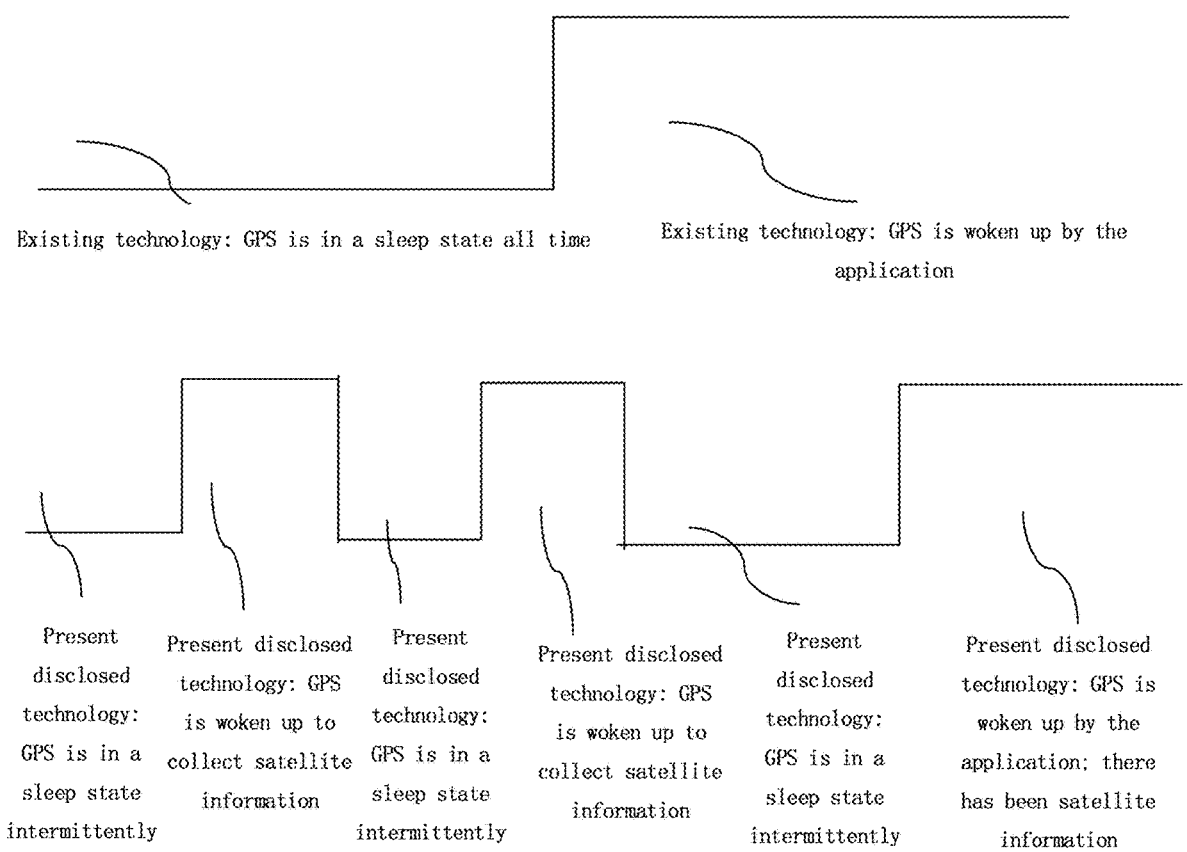
FIG. 5 is a schematic diagram of operating principle of idle monitoring in an embodiment of the present disclosure in comparison with the existing technology.

FIG. 5 is a schematic diagram of operating principle of idle monitoring in the embodiment in comparison with the related technology, in which a part represents a processing scheme in the existing technology and another part represents a processing scheme in the embodiment (the technology of the present disclosure).

Specifically, the implementation of "estimated positioning" is as follows:

First, the time when the application starts GPS positioning is defined as time a, and it is assumed that the boost wake-up has a fixed period $\Delta t$, then the locations at time a-$\Delta t$, time a-$2\Delta t$, time a-$3\Delta t$, . . . , time a-n $\Delta t$ have been stored.

Second, the location information at these times is analyzed, as shown in the following two figures.

Figure 6:
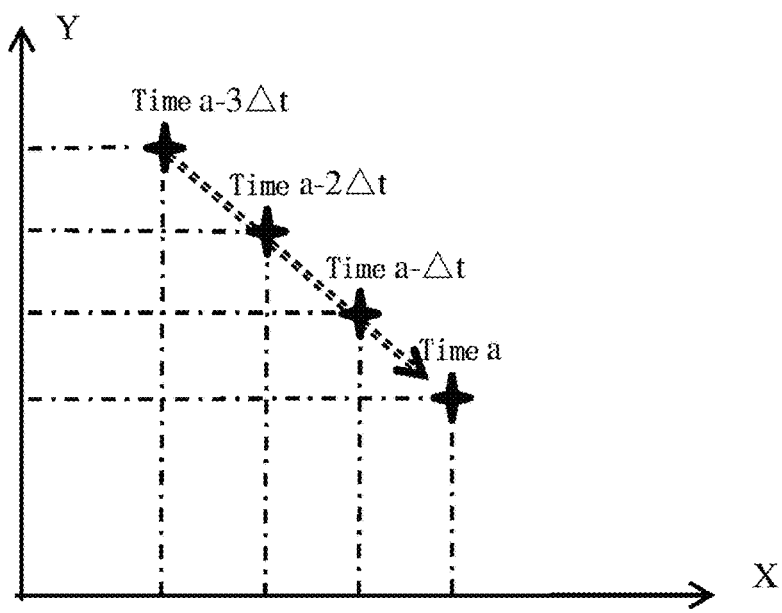
FIG. 6 is a first schematic diagram of location estimation in accordance with an embodiment of the present disclosure.

FIG. 6 is a first schematic diagram of location estimation in accordance with the embodiment. As shown in FIG. 6, it is judged that the current terminal is moving at an "uniform speed" and in an "orientation" based on known location coordinates at the time a-$\Delta t$, time a-$2\Delta t$, and time a-$3\Delta t$. As such, the current location (location at time a) of the terminal can be accurately estimated based on the location coordinates at the time a-$\Delta t$, time a-$2\Delta t$, and time a-$3\Delta t$.

Figure 7:
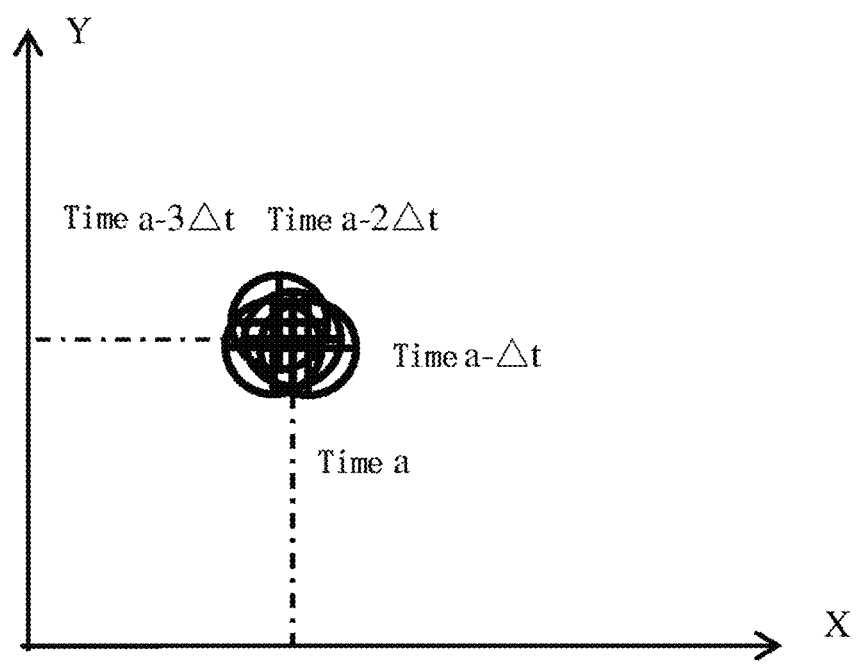
FIG. 7 is a second schematic diagram of location estimation in accordance with an embodiment of the present disclosure.

FIG. 7 is a second schematic diagram of location estimation in accordance with the embodiment. As shown in FIG. 7, it is judged that the current terminal is "relatively static" based on known location coordinates at the time a-$\Delta t$, time a-$2\Delta t$, and time a-$3\Delta t$, which show that the location fluctuation is less than a certain limiting value (for example, GPS detection accuracy of 0.5 m). As such, the current location (location at time a) of the terminal can be accurately estimated based on the location coordinates at the time a-$\Delta t$, time a-$2\Delta t$, and time a-$3\Delta t$.

Finally, different strategies may be used for the "estimated positioning". Alternatively, the "estimated positioning" may be directly reported to the application and real-time positioning is made at the same time, and it is not updated if a deviation is less than the limiting value. Alternatively, it is waited and real-time positioning is made at the same time, when the similarity between real-time positioning satellite data information and "estimated positioning" exceeds a certain threshold percentage, the "estimated positioning" is reported to the application without waiting for complete positioning information.

In the second step, with respect to a functional module interfering with GPS, time-division multiplexing is utilized.

Figure 8:
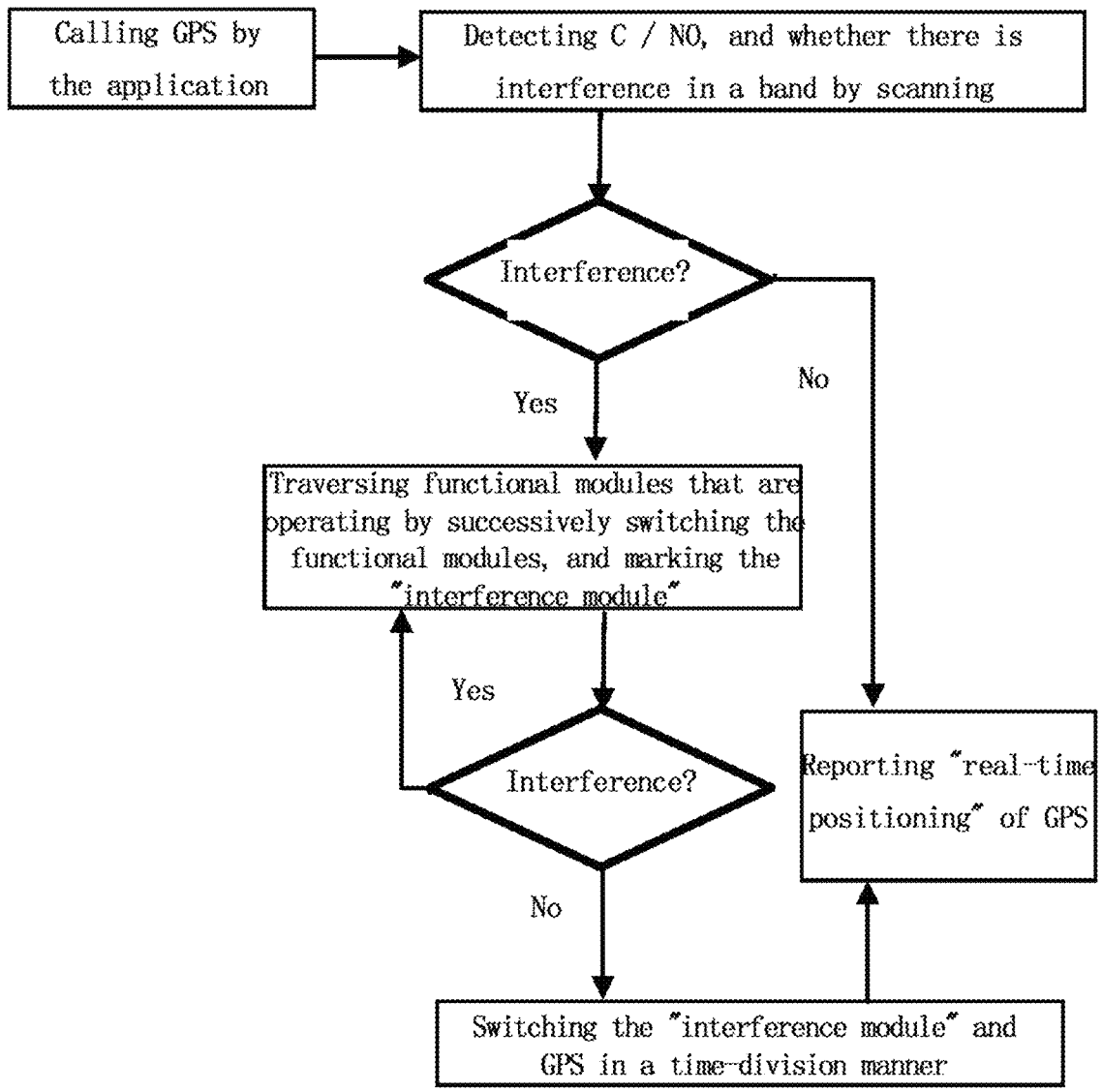
FIG. 8 is a schematic diagram of operating principle of time-division multiplexing of an interference module and GPS in accordance with an embodiment of the present disclosure.

According to a concept of time-division, a module that may interfere with GPS operation is suspended, within a short time window for GPS to collect satellite information. As shown in FIG. 8, FIG. 8 is a schematic diagram of operating principle of time-division multiplexing of an interference module and GPS in accordance with the embodiment.

The terminal may first use its own wireless receiving unit to perform spectrum scanning, such as detecting C/N0 (ratio of carrier power to noise power), to check whether there is interference within a GPS frequency band. If there is interference, a component module that is operating is closed and the interference within the GPS frequency band is checked again until the interference disappears to determine which module or modules the interference source is. After the analysis is completed, GPS and these modules operate in a time-division manner to ensure the best GPS operating and provide "real-time positioning".

Specifically, for time-division multiplexing, two types of interference functional modules and how to perform time-division multiplexing under two types of interference are exemplified, but not limited to these two types.

Figure 9:
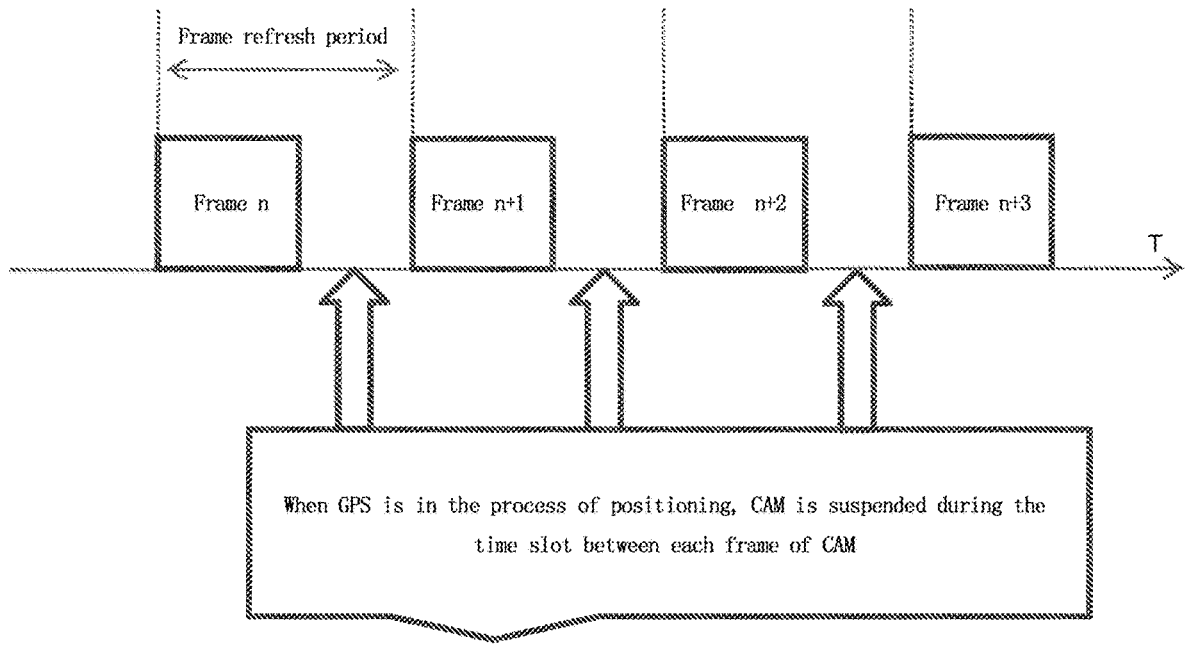
FIG. 9 is a schematic diagram of time-division multiplexing of a camera (CAM) and GPS in accordance with an embodiment of the present disclosure.

For example, the operation of CAM has a greater impact on GPS. The CAM then is suspended intermittently, considering the refresh rate of the CAM, within a short window period for GPS collecting satellite information. As such, the interference can be avoided, and the accuracy of the GPS collecting satellite information can be improved. FIG. 9 is a schematic diagram of time-division multiplexing of CAM and GPS in accordance with the embodiment.

Figure 10:
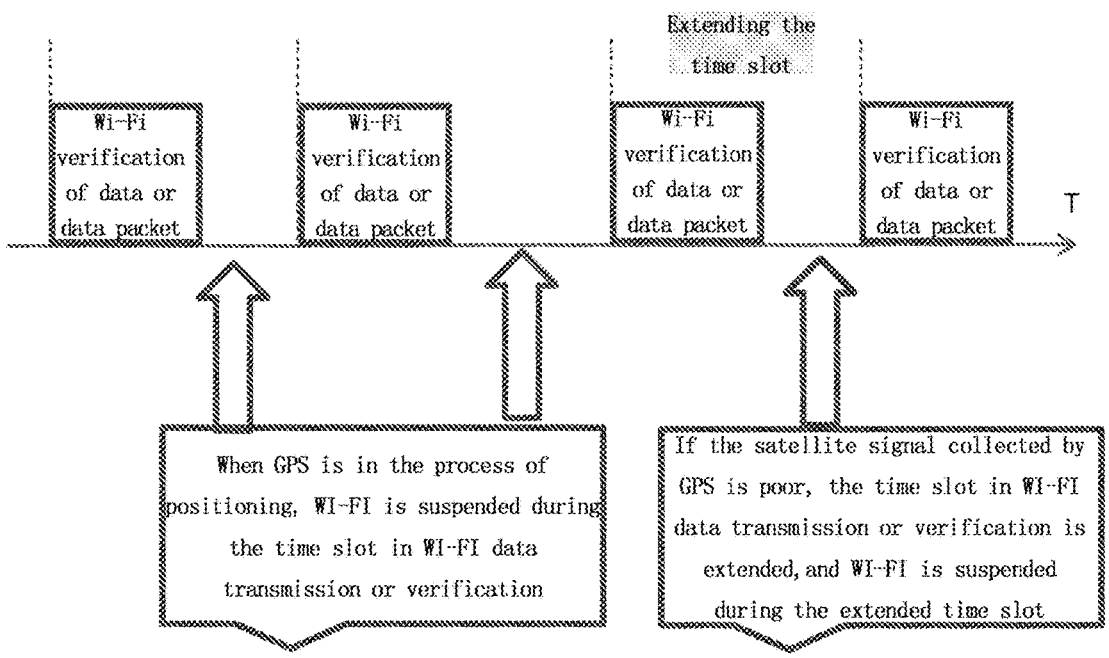
FIG. 10 is a schematic diagram of time-division multiplexing of a wireless fidelity (Wi-Fi) and GPS in accordance with an embodiment of the present disclosure.

For example, the operation of Wi-Fi has a greater impact on GPS. The Wi-Fi then is suspended, considering the time slot between transmission and verification of Wi-Fi packets, within a short time window for GPS collecting satellite information. When the signal quality is poor, the time slot is extended and Wi-Fi is suspended during the extended time slot to ensure that the GPS has sufficient operating time. This time slot switching is done by the radio frequency switch. The switching can be achieved because GPS and Wi-Fi usually share one antenna. As such, the interference can be avoided, and the accuracy of the GPS collecting satellite information can be improved. FIG. 10 is a schematic diagram of time-division multiplexing of Wi-Fi and GPS in accordance with the embodiment.

In the third step, according to the strategy, the terminal provides "final positioning" based on the information of "estimation positioning" (also called estimated positioning) and "real-time positioning".

"Estimation positioning" has the advantage of being fast, and estimated through algorithms.

"Real-time positioning" has the advantage of accuracy, especially due to interference elimination according to the method in the present disclosure.

The choice of terminal strategy may be varied and not limited in the present disclosure. The "final positioning" result tending to "estimated positioning" or "real-time positioning" may be provided.

It should be noted that any obvious modified schemes collecting information for "estimated positioning" by monitoring in advance, fall into the scope of the present disclosure. There may be various implementations, for example, different mechanisms for triggering monitoring, different choices of sleep interval time, and the like. All modified schemes of using time-division multiplexing in GPS operation to avoid the operation of the module causing interference to GPS, fall into the scope of the present disclosure. There may be various implementations, for example, different mechanisms for determining the priority of the GPS operation, different results of the GPS operation during each time slot, different performance compromises based on judgments of the degree of impact from the operation of other modules, and the like.

The scheme of the embodiment has advantages as follows. The terminal integrates multiple functions, each of which has a requirement for fast positioning of GPS. GPS operates in a complex environment and is easily interfered. The present disclosure can solve this problem and ensure that GPS can quickly and accurately perform positioning. The application of the scheme of the embodiment is reliable and low in cost.

The scheme of this embodiment has a wide range of application. The scenarios utilizing wireless communication apparatus are very complicated, at present, a terminal may integrate multiple functions, each of which has a requirement for fast and accurate positioning of GPS, and the GPS operation is easily interfered. The schemes according to the present disclosure are provided to solve this problem and ensure that GPS can quickly and accurately perform positioning.

The schemes according to the present disclosure, can be applied to all GPS communication apparatuses, with good effects. The optimization of GPS performance can be applied to, not only a terminal, but also other apparatus with a wireless module, such as a portable product, or an on-board device.

Fourth Embodiment

According to an embodiment of the present disclosure, there is further provided a storage medium. Optionally, in the embodiment, the storage medium may be configured to store a program for performing the following steps:

S1, detecting, after a positioning module of a terminal is woken up, whether there is a functional module causing signal interference to the positioning module; and S2, closing the functional module in a time-division manner, in response to there being the functional module, and acquiring collected first location information, in response to the positioning module meeting a pre-determined condition.

That is, the storage medium provided in the embodiment of the present disclosure may be configured to store a program for performing the method according to embodiments of the present disclosure.

Optionally, in the embodiment, the above storage medium may include, but is not limited to, various media that can store program codes, such as USB flash disk, ROM, RAM, mobile hard disk, magnetic disk, optical disk, and the like.

In an embodiment of the present disclosure, there is further provided a processor configured to execute a program, when executed, performing the steps in any of the above methods.

Optionally, in the embodiment, the above program is configured to perform the following steps:

S1, detecting, after a positioning module of a terminal is woken up, whether there is a functional module causing signal interference to the positioning module; and S2, closing the functional module in a time-division manner, in response to there being the functional module, and acquiring collected first location information, in response to the positioning module meeting a pre-determined condition.

Optionally, for specific examples in the embodiment, reference may be made to examples described in the foregoing embodiments and the optional implementation, which are not detailed here.

It is apparent to those skilled in the art that the various modules or steps of the present disclosure described above can be implemented by a general-purpose computing device, and may be integrated in a single computing device or distributed across a network consisting of multiple computing devices. Optionally, the modules or steps may be implemented by program codes executable by the computing device. Therefore, the modules or steps may be stored in the memory device and executed by the computing device. In some cases, the steps as shown or described may be executed in a different order from the order illustrated herein, or manufactured respectively as individual integrated circuit modules, or multiple modules or steps thereof can be manufactured as a single integrated circuit module. As such, the present disclosure is not limited to any specific combination of hardware and software.

The foregoing description merely portrays some illustrative embodiments according to the present disclosure, which are not intended to limit the present disclosure, and various modifications and changes can be made to the present disclosure by those skilled in the art. Any modifications, equivalent substitutions, improvements or the like made within the nature and principle of the present disclosure will fall into the scope of protection of the present disclosure.

The invention claimed is:

1. A method for acquiring location information, comprising:
  detecting, after a positioning module of a terminal is woken up, whether there is a functional module causing signal interference to the positioning module;
  closing the functional module in a time-division manner, in response to there being the functional module; and acquiring collected first location information, in response to the positioning module meeting a pre-determined condition;
  waking up the positioning module in accordance with a preset period, in response to the positioning module being in a sleep state;
  acquiring location data of the terminal by the positioning module, and storing the location data in the terminal;
  estimating second location information of the terminal after waking up the positioning module by using different positioning data acquired in different periods, after waking up the positioning module by the terminal; and
  determining a positioning location of the terminal based on the first location information and the second location information, after acquiring the first location information and the second location information, comprising one of:
    determining the first location as the positioning location of the terminal, calculating a deviation between the first location information and the second location information, not updating the positioning location, in response to the deviation being less than a first limiting value, and updating the positioning location using the second location information, in response to the deviation being greater than the first limiting value;
    calculating a deviation between the first location information and the second location information, determining the first location information as the positioning location of the terminal, in response to the deviation being less than a second limiting value, and determining the second location information as the positioning location of the terminal, in response to the deviation being not less than the second limiting value; and
    determining the second location information as the positioning location of the terminal, in response to the first location information being not collected within a pre-determined time.

2. The method according to claim 1, wherein, detecting whether there is a functional module causing interference to the positioning module, comprises:
  detecting whether there is interference within a frequency band of the positioning module by spectrum scanning.

3. The method according to claim 1, wherein, detecting whether there is a functional module causing signal interference to the positioning module, comprises:
  checking the interference within a frequency band of the positioning module, after traversing one or more functional modules that are operating in the terminal by closing the one or more functional modules; and
  determining that a currently closed functional module is an interference source generating interference signal, in response to a reduction of the interference being detected.

4. The method according to claim 1, wherein, acquiring collected first location information, in response to the positioning module meeting a pre-determined condition, comprises:
  acquiring the collected first location information, in response to the positioning module meeting at least one of following conditions: at least a pre-determined number of satellites are searched; a carrier-to-noise ratio is greater than a first threshold; and interference signal of the functional module is less than a second threshold.

5. The method according to claim 1, wherein the functional module comprises at least one of: a camera module; and a wireless fidelity Wi-Fi module.

6. The method according to claim 1, wherein, closing the functional module in a time-division manner, comprises:
  closing the functional module within an operating time window of the positioning module.

7. A terminal, comprising:
  a detection module configured to detect, after a positioning module of a terminal is woken up, whether there is a functional module causing signal interference to the positioning module;
  a first acquisition module configured to close the functional module in a time-division manner, in response to there being the functional module, and acquire collected first location information, in response to the positioning module meeting a pre-determined condition;
  an activation module configured to wake up the positioning module in accordance with a preset period, in response to the positioning module being in a sleep state;
  a second acquisition module configured to acquire location data of the terminal by the positioning module, and storing the location data in the terminal;
  an estimation module configured to estimate second location information of the terminal after waking up the positioning module by using different positioning data acquired in different periods, after waking up the positioning module by the terminal; and
  a positioning module configured to determine a positioning location of the terminal based on the first location information and the second location information, after acquiring the first location information and the second location information, wherein the positioning module configured to one of:
  determine the first location as the positioning location of the terminal, calculate a deviation between the first location information and the second location information, not update the positioning location, in response to the deviation being less than a first limiting value, and update the positioning location using the second location information, in response to the deviation being greater than the first limiting value;
  calculate a deviation between the first location information and the second location information, determine the first location information as the positioning location of the terminal, in response to the deviation being less than a second limiting value, and determine the second location information as the positioning location of the terminal, in response to the deviation being not less than the second limiting value; and
  determine the second location information as the positioning location of the terminal, in response to the first location information being not collected within a pre-determined time.

8. The terminal according to claim 7, further comprising:
a processing module configured to check the interference within a frequency band of the positioning module, after traversing one or more functional modules that are operating in the terminal by closing the one or more functional modules; and
a determination module configured to determine that a currently closed functional module is an interference source generating interference signal, in response to a reduction of the interference being detected.

9. The terminal according to claim 7, wherein the first acquisition module comprises:
an acquisition unit configured to acquire the collected first location information, in response to the positioning module meeting at least one of following conditions: at least a pre-determined number of satellites are searched; a carrier-to-noise ratio is greater than a first threshold; and interference signal of the functional module is less than a second threshold.

10. A non-transitory computer-readable storage medium comprising a stored program which, when executed, performs a method for acquiring location information, the method comprising:
  detecting, after a positioning module of a terminal is woken up, whether there is a functional module causing signal interference to the positioning module; and
  closing the functional module in a time-division manner, in response to there being the functional module; and acquiring collected first location information, in response to the positioning module meeting a pre-determined condition;
  waking up the positioning module in accordance with a preset period, in response to the positioning module being in a sleep state;
  acquiring location data of the terminal by the positioning module, and storing the location data in the terminal;
  estimating second location information of the terminal after waking up the positioning module by using different positioning data acquired in different periods, after waking up the positioning module by the terminal; and
  determining a positioning location of the terminal based on the first location information and the second location information, after acquiring the first location information and the second location information, comprising one of:
    determining the first location as the positioning location of the terminal, calculating a deviation between the first location information and the second location information, not updating the positioning location, in response to the deviation being less than a first limiting value, and updating the positioning location using the second location information, in response to the deviation being greater than the first limiting value;
    calculating a deviation between the first location information and the second location information, determining the first location information as the positioning location of the terminal, in response to the deviation being less than a second limiting value, and determining the second location information as the positioning location of the terminal, in response to the deviation being not less than the second limiting value; and
  determining the second location information as the positioning location of the terminal, in response to the first location information being not collected within a pre-determined time.

11. An electronic device comprising a memory, a processor, and a computer program stored in the memory and executable by the processor, the processor performing a method for acquiring location information, the method comprising:
  detecting, after a positioning module of a terminal is woken up, whether there is a functional module causing signal interference to the positioning module; and
  closing the functional module in a time-division manner, in response to there being the functional module; and acquiring collected first location information, in response to the positioning module meeting a pre-determined condition;
  waking up the positioning module in accordance with a preset period, in response to the positioning module being in a sleep state;
  acquiring location data of the terminal by the positioning module, and storing the location data in the terminal;
  estimating second location information of the terminal after waking up the positioning module by using different positioning data acquired in different periods, after waking up the positioning module by the terminal; and
  determining a positioning location of the terminal based on the first location information and the second location information, after acquiring the first location information and the second location information, comprising one of:
    determining the first location as the positioning location of the terminal, calculating a deviation between the first location information and the second location information, not updating the positioning location, in response to the deviation being less than a first limiting value, and updating the positioning location using the second location information, in response to the deviation being greater than the first limiting value;
    calculating a deviation between the first location information and the second location information, determining the first location information as the positioning location of the terminal, in response to the deviation being less than a second limiting value, and determining the second location information as the positioning location of the terminal, in response to the deviation being not less than the second limiting value; and determining the second location information as the positioning location of the terminal, in response to the first location information being not collected within a predetermined time.

* * * * *